F. HEATH.

COLLAPSIBLE VEHICLE BOX.

APPLICATION FILED MAY 16, 1918.

Reissued Aug. 6, 1918. 14,500.

WITNESSES

E. G. Wells

A. H. Opsahl

INVENTOR

Frank Heath

BY HIS ATTORNEYS

Williamson & Merchant

UNITED STATES PATENT OFFICE.

FRANK HEATH, OF SAN DIEGO, CALIFORNIA, ASSIGNOR OF ONE-HALF TO D. C. BENTON, OF SAN DIEGO, CALIFORNIA.

COLLAPSIBLE VEHICLE-BOX.

14,500. Specification of Reissued Letters Patent. Reissued Aug. 6, 1918.

Original No. 1,209,577, dated December 19, 1916, Serial No. 37,255, filed June 30, 1915. Application for reissue filed May 16, 1918. Serial No. 235,031.

*To all whom it may concern:*

Be it known that I, FRANK HEATH, a citizen of the United States, residing at San Diego, in the county of San Diego and State of California, have invented certain new and useful Improvements in Collapsible Vehicle-Boxes, of which the following is a specification.

My invention relates to a collapsible box to be used in connection with the rear end of a vehicle more particularly an automobile, so that said vehicle may be readily converted from a passenger vehicle to a delivery vehicle and from a delivery vehicle to a passenger vehicle.

The objects of my invention are, first to provide a device to be used in connection with the rear end of a vehicle, for delivery or carrying purposes, which is collapsible and may be readily folded up and the rear seat frame of a vehicle readily placed thereon, thus making the vehicle quickly convertible for use either as a delivery vehicle or a passenger vehicle; second, to provide a foldable box, for delivery or carrying purposes, which combines strength and durability with economy of space when folded; third, to provide a device of this class which is readily made applicable for use with vehicles already constructed with but slight changes therein; and fourth, to provide a device of this class, which is simple and economical of construction, durable, easily installed and will not readily get out of order.

With these and other objects in view, as will appear hereinafter, my invention consists of certain novel features of construction, combination and arrangement of parts, as will be hereinafter described in detail and particularly set forth in the appended claims, reference being had to the accompanying drawings and to the characters of reference thereon, which form a part of this specification, in which:

Similar characters of reference refer to similar parts throughout the several views.

Figure 1:
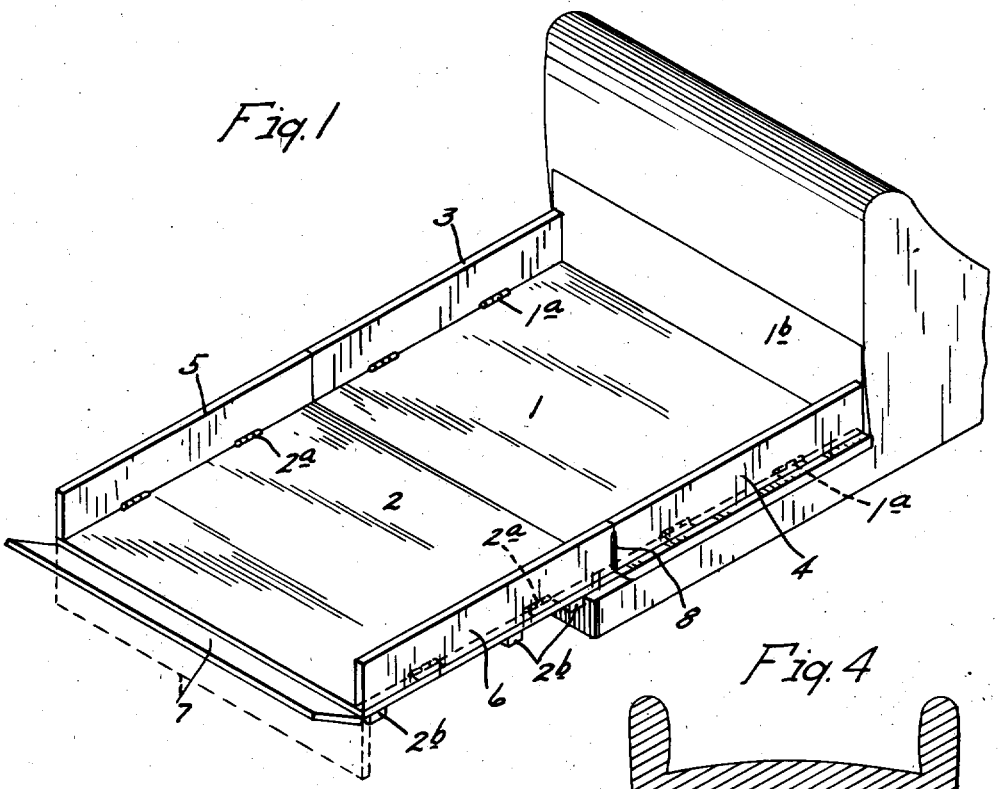
Figure 1 is a perspective view of my device complete, shown mounted on the rear end of a vehicle frame.
Figure 4:
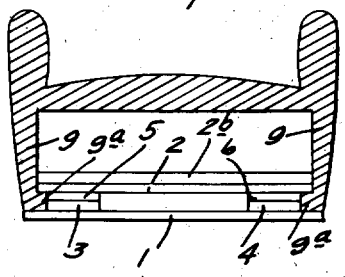
Fig. 4 is a rear end view of my device, shown in its folded form, and showing a vehicle rear seat frame in section mounted thereon.
Figure 2:
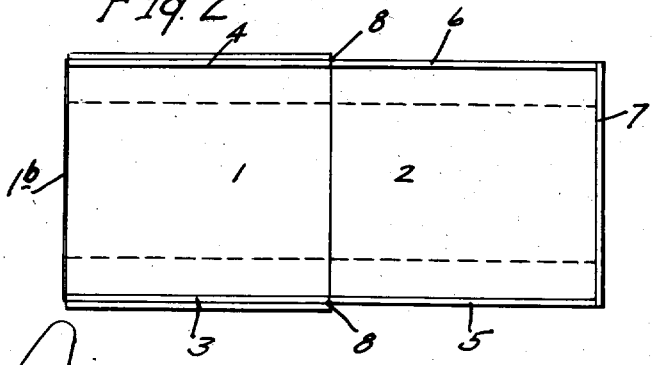
Fig. 2 is a top or plan view of my box device in its extended form.

The main stationary part 1, main foldable part 2, side pieces 3, 4, 5 and 6, end piece 7, hinges 8 and rear seat frame side pieces 9, constitute the principal parts of my device.

Figure 5:
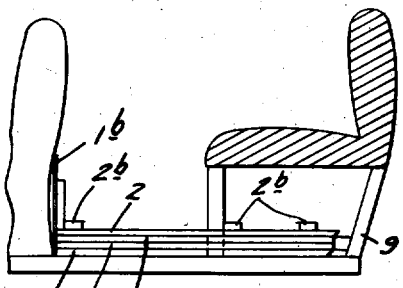
Fig. 5 is a side elevational view of my device, shown in the folded form and mounted on the rear end of a vehicle frame, and showing the rear seat frame in section.
Figure 3:
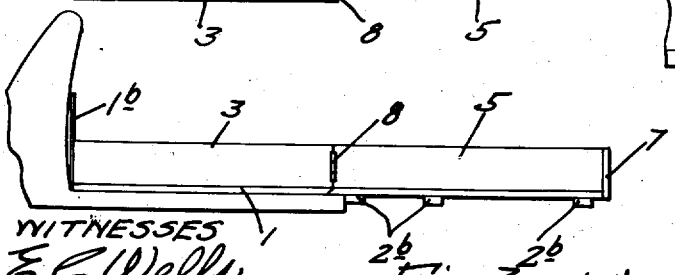
Fig. 3 is a side elevational view of the same, shown mounted on the rear of a vehicle frame.

The main stationary part 1 is secured to the upper surface of the frame of the vehicle back of the front seat and is slightly shorter than said frame. It is provided with an upwardly extending portion $1^b$ adapted to protect the rear surface of the vehicle seat. Hinged to the sides thereof, a short distance from its edges, are the side pieces 3 and 4, by means of the hinges $1^a$, and connected to these side pieces 3 and 4, at their outwardly extended ends, are side pieces 5 and 6, by means of the hinges 8, and to the lower sides of these pieces 5 and 6 is hinged, by means of hinges $2^a$, the main foldable part 2, which is adapted, when in the position shown in Fig. 1, to rest against the outward end of the main stationary part 1, the frame of the vehicle extending slightly under this main part 2, when in such position, to support it along its inner edge. Hinged to the lower side of the main foldable part 2, is the end piece 7, which is adapted as an end gate, when it is up against the ends of the side pieces 5 and 6, but it may be readily dropped down, as shown by dotted lines in Fig. 1 of the drawing. This main foldable part 2 is provided on its lower surface with a plurality of cleats $2^b$ for reinforcing this piece, two of which are under the rear seat of the vehicle, when used for passenger purposes, and the other serves as a foot rest, located just back of the front seat. This provides a device for delivery purposes, the rear over-hanging portion being connected to the other parts by means of the hinges 8. When it is desired to convert the vehicle into a passenger vehicle, the end piece 7 is dropped down in the position shown by dotted lines in Fig. 1 of the drawing, the side pieces 3, 4, 5 and 6 are folded down against the main pieces 1 and 2 on the hinges $1^a$ and $2^a$, then the pieces 2, 5, 6 and 7 are folded over the pieces 3 and 4, by means of the hinges 8, the end pieces 7 extending upwardly against the back of the seat, as shown best in Fig. 5 of the drawing. The rear seat frame is provided with cleats $9^a$, adapted to fit between the pieces 1 and 2, the piece 1 being extended on the sides, as hereinbefore described, to provide a support for the sides of the rear seat frame and said cleats are slid endwise into the slots between the outer edges of these pieces, thus providing a substantial support for the rear seat frame of the vehicle.

From the drawings and the foregoing description of the illustrated structure, it is obvious that the collapsible delivery box is supported from the main or fixed portion of the vehicle; that the rear seat is demountable and has parts adapted to telescope with parts available on the vehicle body, when the box is in its collapsed position, and which telescoping parts hold said rear seat in its proper working position; that when said rear seat is in its said working position, it conceals the collapsible delivery box; and that when said rear seat is demounted or removed, the delivery box becomes available for extension and usage.

Though I have shown and described a particular construction, combination and arrangement of parts, I do not wish to be limited to this particular construction, combination and arrangement, but desire to include in the purview of my invention, the construction, combination and arrangement substantially as set forth in the appended claims. It is obvious that with this construction, there is provided a foldable or collapsible box to be used in connection with the rear seat of a vehicle, so that said vehicle may be readily converted from a passenger vehicle to a delivery or carrying vehicle and from a delivery or carrying vehicle to a passenger vehicle; that the device is simple and economical of construction, durable, and easily installed and that it is readily made applicable to vehicles already built with but slight changes in their construction.

What I claim is:

1. In a device of the class described, the combination of an automobile body frame, a stationary floor part for the rear end thereof secured thereto, side pieces foldable inwardly onto said stationary part, similar side pieces connected to the extended ends thereof by means of hinges, another floor part connected to said latter mentioned side pieces by hinges whereby when said side pieces are folded down, said latter mentioned piece will fold up over said stationary piece, an end-gate hinged to said latter mentioned floor part, and a rear seat frame provided with inwardly extending flanges adapted to slide between the side edges of said floor parts when they are in their folded position.

2. In a device of the class described, the combination with the rear end of the frame of a vehicle, of a bottom part rigidly secured thereto extending from the back of the front seat to near the rear end of said frame, side pieces mounted thereon foldable inwardly against said bottom part, similar side pieces with their ends hinged to the outwardly extending ends of said first mentioned side pieces so as to fold upon said side pieces when they are folded down on said bottom part, another bottom part hinged to said last mentioned side pieces adapted to fold with said pieces and when in its extended position said last mentioned body part is supported by the rear end frame of said vehicle.

3. In a device of the class described, the combination with the rear end of the frame of a vehicle, of a bottom part rigidly secured thereto extending from the back of the front seat to near the rear end of said frame, side pieces mounted thereon foldable inwardly against said bottom part, similar side pieces with their ends hinged to the outwardly extending ends of said first mentioned side pieces so as to fold upon said side pieces when they are folded down on said bottom part, another bottom part hinged to said last mentioned side pieces adapted to fold with said pieces and when in its extended position said last mentioned body part is supported by the rear end frame of said vehicle and an end-gate hinged to said body part whereby it forms an end-gate when folded against the ends of said side pieces and a foot rest when in its folded position.

4. A vehicle body comprising a fixed main portion having a front seat, a collapsible delivery box supported therefrom, and a demountable rear seat, which seat when in working position conceals the collapsed delivery box, but which seat when removed renders said delivery box available for extension and usage, substantially as described.

5. A vehicle body comprising a fixed main portion having a front seat, a collapsible delivery box supported therefrom, and a demountable rear seat having parts adapted to telescope with parts available on the vehicle body when the box is in its collapsed position, and which seat when in working position conceals the collapsed delivery box but which seat when removed renders said delivery box available for extension and usage, substantially as described.

In testimony whereof I affix my signature in presence of two witnesses.

FRANK HEATH.

Witnesses:
IRENE COULTER,
ROBERT HALLEY, Jr.